United States Patent

Monier

[11] Patent Number: 5,999,953
[45] Date of Patent: Dec. 7, 1999

[54] METHOD FOR THE PRODUCTION OF A PARAMETER $J_0$ ASSOCIATED WITH THE IMPLEMENTATION OF A MODULAR OPERATION ACCORDING TO THE MONTGOMERY METHOD

[75] Inventor: Guy Monier, Rognac, France

[73] Assignee: STMicroelectronics S.A., Saint Genis, France

[21] Appl. No.: 08/759,892

[22] Filed: Dec. 3, 1996

[30] Foreign Application Priority Data

Dec. 4, 1995 [FR] France .................................. 95 14614

[51] Int. Cl.$^6$ ................................ G06F 7/38; G06F 7/00
[52] U.S. Cl. ........................... 708/250; 708/561; 708/250
[58] Field of Search ................................ 364/746, 746.1, 364/717.01, 736.01, 724.04; 380/30; 371/2.1, 5.5, 48, 21.1; 708/560, 561, 250, 306, 500

[56] References Cited

U.S. PATENT DOCUMENTS

| | | | |
|---|---|---|---|
| 4,538,237 | 8/1985 | Circello | 364/746 |
| 4,891,781 | 1/1990 | Omura | 364/768 |
| 5,261,001 | 11/1993 | Dariel et al. | 380/30 |
| 5,513,133 | 4/1996 | Gressel et al. | 364/754 |
| 5,535,225 | 7/1996 | Mayhew et al. | 371/37.1 |
| 5,745,398 | 4/1998 | Monier | 364/746.1 |
| 5,764,554 | 6/1998 | Monier | 364/746 |

FOREIGN PATENT DOCUMENTS

| | | | |
|---|---|---|---|
| 0 502 782 | 9/1992 | European Pat. Off. | G06F 7/72 |
| 0 601 907 | 6/1994 | European Pat. Off. | G06F 7/72 |

OTHER PUBLICATIONS

French Search Report from French Patent Application 95 14614, filed Dec. 4, 1995.

Computer Journal, vol. 37, No. 3, 1994, London GB, pp. 219–222, B. Arazi: "On Primality Testing Using Purely Divisionless Operations".

IEEE Journal on Selected Areas in Communications, vol. 11, No. 5, Jun. 1, 1993, pp. 761–769, Arazi, B. "Double–Precision Modular Multiplication Based on a Single–Precision Modular Multiplier and a Standard CPU".

*Primary Examiner*—Ayaz R. Sheikh
*Assistant Examiner*—Tim T. Vo
*Attorney, Agent, or Firm*—Wolf,Greenfield & Sacks, P.C.

[57] ABSTRACT

The present invention relates to various methods and apparatus for obtaining a parameter $J_0$ that is used in modular computations using the Montgomery method. The parameter $J_0$ is defined by the formula $(J_0 * N_0 + 1) \bmod 2^{Bt} = 0$, Bt being the working base in which the Montgomery method is carried out, and $N_0$ being the Bt least significant bits of a modulo N used in the Montgomery method.

25 Claims, 3 Drawing Sheets

METHOD FOR THE PRODUCTION OF A PARAMETER $J_O$ ASSOCIATED WITH THE IMPLEMENTATION OF A MODULAR OPERATION ACCORDING TO THE MONTGOMERY METHOD

BACKGROUND OF THE INVENTION

1. Field of the Invention

The present invention relates to a method and apparatus for the production of a computation parameter that is used in the implementation of modular operations according to the Montgomery method, enabling the performance of modular computations in a finite field denoted $GF(2^n)$, namely a Galois field with 2n elements, without carrying out any division.

2. Discussion of the Related Art

Conventionally, modular operations on $GF(2^n)$ are used in cryptography for applications such as the authentication of messages, the identification of a user and the exchange of keys. Such exemplary applications are described for example in the French patent application published under No. 2 679 054.

There are commercially available integrated circuits dedicated to such applications. These include, for example, the product referenced ST16CF54 manufactured by SGS-THOMSON MICROELECTRONICS S.A., built around a combination of devices including a central processing unit and an arithmetic coprocessor dedicated to the performance of modular computations. The coprocessor enables the processing of operations of modular multiplication by using the Montgomery method. The coprocessor is the object of a European patent application filed under the reference No. 0 601 907 A2, and illustrated in FIG. 2 of the present application (FIG. 2 of the present application corresponds to FIG. 2 of the aforementioned European patent application).

The Montgomery method enables the computation of a basic operation, called a $p_{field}$ operation. This basic operation consists of the production, on the basis of three binary data elements, A (multiplicand), B (multiplier) and N (modulo) encoded on a whole number of bits n, of a binary data element denoted $P_{field}(A, B)_N$ encoded on n bits, such that $P_{field}(A, B)_N = A*B*I \bmod N$, with $I=2^{-n} \bmod N$.

Conventionally, n is equal to 256, 512, and in the very near future it will be equal to 1024. To resolve the operation $P_{field}$, a working base is used, namely some of the computations needed for the resolution are done on Bt bits instead of n bits, for example Bt=32. It is noted that there is an integer k such that $k*Bt \geq n > (k-1)*Bt$. The use of a working base makes it possible to reduce the surface area of the computation circuits, especially the multiplier circuits, while at the same time maintaining a good processing speed.

To resolve the operation $P_{field}(A, B)_N = S$, a much used algorithm uses the following variables:

A as an integer encoded on n bits and split up into k words of Bt bits denoted $A_0$ to $A_{k-1}$, B as an integer encoded on n bits and represented on one word of (k*Bt) bits, N as an odd-parity integer encoded on n bits and represented on one word of (k*Bt) bits. The reference $N_0$ denotes the word of Bt bits corresponding to the Bt least significant bits of N, S(i) as an integer encoded on (k*Bt)+1 bits representing an updated value of the result S for one iteration i, X and Z as two integers encoded on ((k+1)*Bt)+1 bits, $Y_0$ as an integer encoded on Bt bits, $J_0$ as an integer encoded on Bt bits and such that $((J_0*N_0)+1) \bmod 2^{Bt}=0$.

The mathematical algorithm that can be transposed both to an integrated circuit and to a software processing operation is the following:

zero-setting of S(0), the implementation of a loop indexed i, with i varying from 1 to k:

B1: computation of $X=S(i-1)+(B*A_{i-1})$,

B2: computation of $Y=(X*J_0) \bmod 2^{Bt}$, where the operation mod $2^{Bt}$ corresponds only to a truncation, B3: computation of $Z=X+(Y*N)$, B4: computation of $S(i)=Z \backslash 2^{Bt}$, where the symbol \ represents an integer division, B5: if S(i) is greater than N then N is subtracted from S(i), and it is possible to recover the result $S=S(k)=P_{field}(A, B)N$.

In cryptography, during the encoding (or decoding) of a message, this type of operation is used many times. It is therefore highly worthwhile to perform this algorithm at the highest possible speed. Furthermore, the time it takes to compute the parameter $J_0$ is a factor in the overall computation time. At present, there are several known methods of theoretical computation for computing this parameter. For example there is an extended Euclidean algorithm and also an extended Stein algorithm. There is also a method using modular exponentiation and another method using a modular division. These methods are not directly realizable on integrated circuits and the computation of this parameter $J_0$ is done conventionally by software means using an arithmetic coprocessor.

SUMMARY OF THE INVENTION

There is no known publication disclosing a circuit dedicated to the computation of this parameter $J_0$. The present invention is directed to two methods for the production of this computation parameter $J_0$ that enables the performance of this computation at high speed. In a first method, $J_0*N_0$ is performed to determine $J_0$ during the computation in order to obtain $-1 \bmod 2^{Bt}$. A second method consists in performing $J_0*N_0+1$ to determine $J_0$ during the computation in order to obtain $0 \bmod 2^{Bt}$. Another aim of the present invention is a compact circuit dedicated to this computation and therefore capable of being easily integrated into a circuit that requires this parameter to perform other computations.

The present invention thus includes a first method for the production, in an integrated circuit, of a parameter $J_0$ associated with the implementation of modular operations according to the Montgomery method, $J_0$ being encoded on Bt bits, wherein the following steps are carried out:

E1: the loading of an information element $N_0$ encoded on Bt bits, the least significant bit of $N_0$ being equal to 1, in a first and third register of Bt bits, E2: the loading of a 1 into the most significant bit of a second register of Bt bits, E3: the implementation of a loop, indexed by i, i varying from 1 to Bt-1, each iteration comprising the following steps:

B1: the contents of the first register are shifted rightwards by one unit,

B2: the least significant bit of the first register is tested:

T1: if the least significant bit is equal to 1, then the contents of the second register are shifted rightwards by one unit and a 0 is loaded into the most significant bit, T2: if the least significant bit is equal to 0, then the contents of the second register are shifted rightwards by one unit and a 1 is loaded into the most significant bit, the contents of the first and third registers are added bit by bit in an adder, an output of the adder being connected to an input of the first register, an output of the third register being looped to its input, E4: the second register contains the desired parameter $J_0$.

The present invention also includes a second method for the production, in an integrated circuit, of a parameter $J_0$ associated with the implementation of modular operations according to the Montgomery method, $J_0$ being encoded on Bt bits, wherein the following steps are carried out:

E1: the loading of the number 1 represented on Bt bits into a first register of Bt bits, E2: the loading of an information element No encoded on Bt bits, the least significant bit of $N_0$ being equal to 1, in a third register of Bt bits, E3: the implementation of a loop, indexed by i, i varying from 1 to Bt, each iteration comprising the following steps:

B1: the least significant bit of the first register is tested:
T1: if the least significant bit is equal to 0, then the contents of the second register are shifted rightwards by one unit and a 0 is loaded into the most significant bit,
T2: if the least significant bit is equal to 1, then the contents of the second register are shifted rightwards by one unit and a 1 is loaded into the most significant bit, the contents of the first and third registers are added bit by bit in an adder, an output of the adder being connected to an input of the first register, an output of the third register being looped to its input,
B2: the contents of the first register 40 are shifted rightwards by one unit, E4: the second register contains the desired parameter $J_0$.

Variants of these two methods which are slower than these methods but faster than those in the prior art are also described. Indeed, those skilled in the art will appreciate having variants for which it is simpler to set the rate and, in certain cases having a fixed duration can be a security advantage in certain uses.

The present invention also includes an electronic circuit for the computation of a parameter $J_0$ encoded on Bt bits, $J_0$ being defined such that $((J_0*N_0)+1) \mod 2^{Bt}=0$, $N_0$ being encoded on Bt bits. The electric circuit includes a first register, a second register and a third register of n bits each having one serial input and one serial output, the third register having its input connected to its output, an adder circuit having a first series input connected to the series output of the first register, a second series input, and a series output connected to the series input of the first register, a multiplexer circuit having an output connected to the second series input of the adder circuit, a first input connected to the series output of the third register and a second input connected to the wire that is at a potential corresponding to a logic zero, a testing circuit having an input connected to the series output of the adder circuit and an output connected to the series input of the second register.

BRIEF DESCRIPTION OF THE DRAWINGS

The present invention will be understood more clearly and other features and advantages shall appear from the following description of a preferred, non-limiting embodiment of the present invention described by way of example with reference to the accompanying drawings, in which.

DETAILED DESCRIPTION

Figure 1:
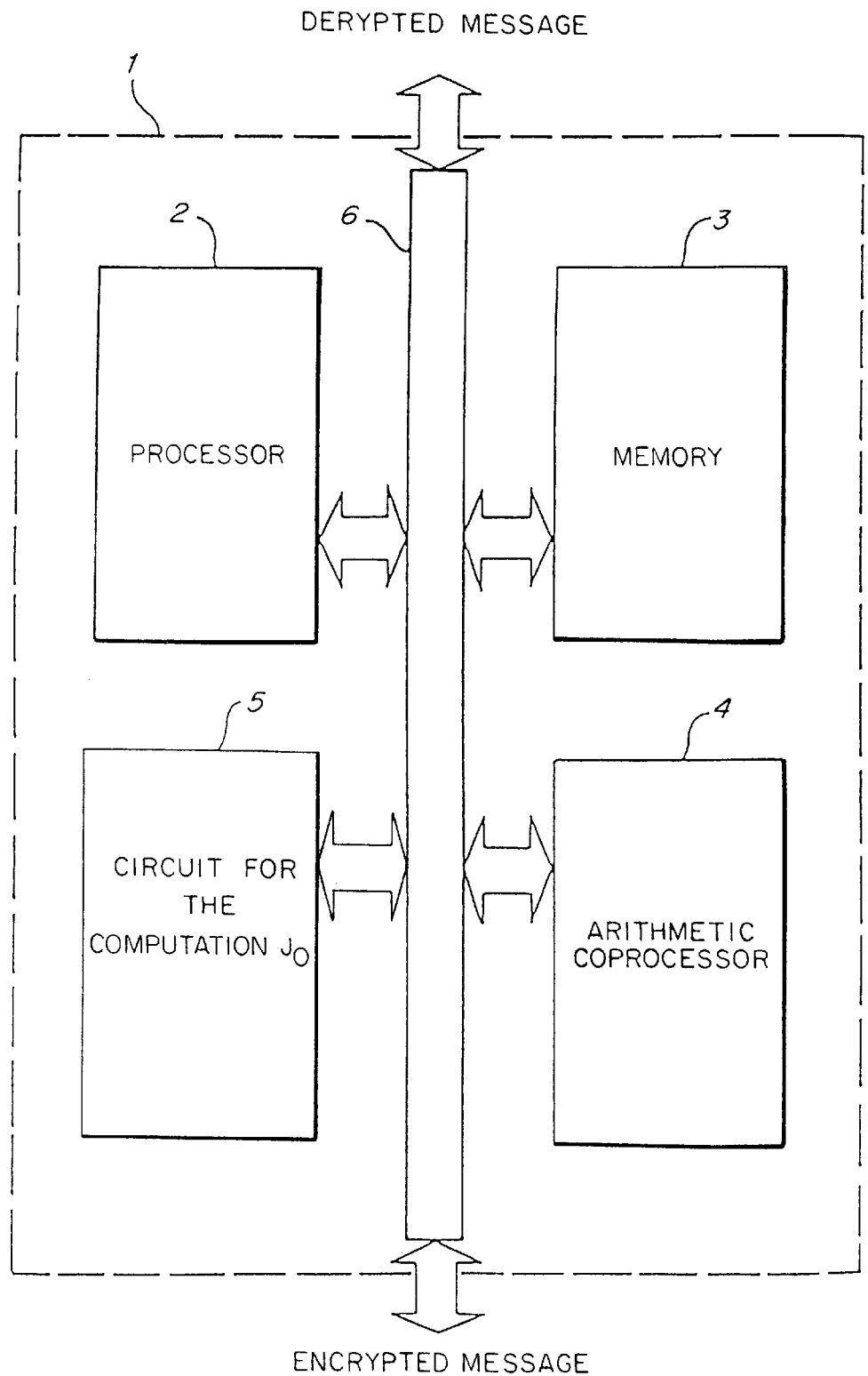
FIG. 1 shows an encryption circuit in which the computation parameter $J_0$ is used.

FIG. 1 shows an encryption circuit 1 comprising a processor 2, for example an 8-bit, 16-bit or 32-bit microprocessor, a memory 3, a coprocessor 4, a circuit 5 dedicated to the computation of $J_0$ and a communications bus 6. The communications bus 6 connects the processor 2, the memory 3, the coprocessor 4 and the $J_0$ computation circuit to one another. This communications bus 6 is also used to receive a decrypted (clear) message or an encrypted message which, after processing, will emerge after a certain processing time, by this same communications bus 6 after having been encrypted or decrypted. An encryption circuit 1 of this kind enables several possibilities of processing. The communications bus 6 covers all the signals that get exchanged within the encryption circuit 1.

A first possibility of processing is purely a software possibility. The processor 2 will carry out all the encryption or decryption computations by means of a program stored in the memory 3. A processing operation of this kind does not require the presence of the coprocessor 4 or the $J_0$ computation circuit 5 but takes considerable time for processing.

A second possibility of processing consists in bringing about the processing of all the computations by means of the coprocessor 4, the processor 2 being used only to control the efficient running of the operations. This possibility provides for very high-speed processing but limits the encryption to operations using data elements compatible with the coprocessor 4 and consequently prevents the performance of certain computations. The use of a $J_0$ computation circuit 5 enables the specific computation of the parameter $J_0$ to be optimized.

A third possibility of processing consists in a combined use of the processor 2, the coprocessor 4 and the $J_0$ computation circuit. This provides for the ability to process all the types of encryption in a period of time smaller than that entailed by the first possibility using purely software means.

Figure 2:
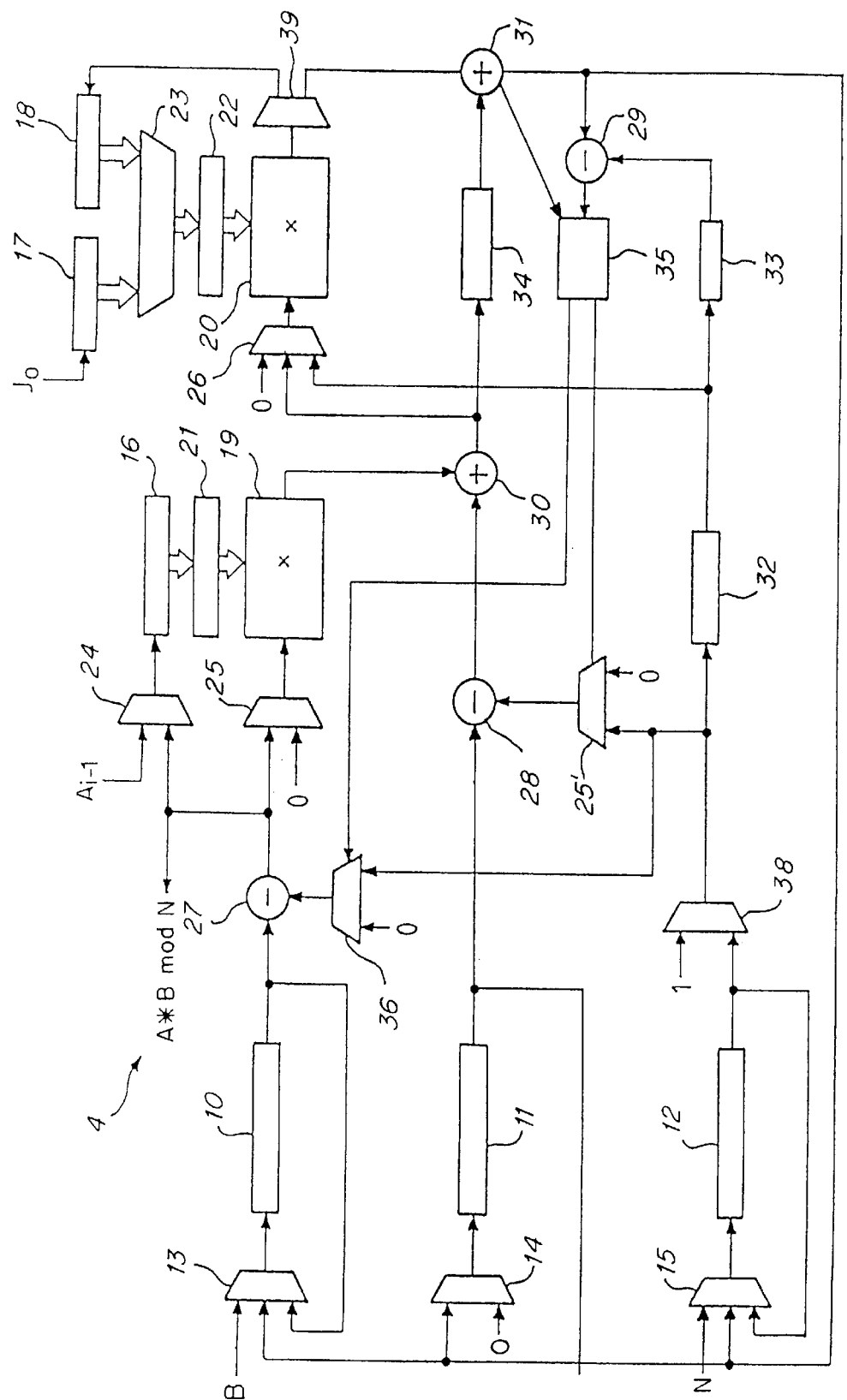
FIG. 2 shows a schematic view of a circuit enabling the implementation of the modular operations according to the Montgomery method.

FIG. 2 shows the modular arithmetic coprocessor 4. This coprocessor 4 comprises:

three shift registers 10, 11 and 12 with series input and output. Each of these registers has one and the same number n of cells, with n=m*k. These registers may be such that they are capable of being divided, for example into registers of n/2 cells and into registers of Bt bits, multiplexers 13, 14 and 15 are placed respectively before the registers 10, 11 and 12. Multiplexers will also be placed before the subdivisions if these subdivisions exist, three registers 16, 17 and 18 each comprising k cells. The registers 16, 17 and 18 are parallel output and series input registers, two multiplication circuits 19 and 20, each comprising one series input, one parallel input and one series output. The parallel input of the multiplication circuit 19 is connected to the output of the register 16 by means of a storage flip-flop circuit 21 having k cells. The parallel input of the multiplication circuit 20 is connected to one of the outputs of the registers 17 or 18, by means of a storage flip-flop circuit 22 having k cells. This flip-flop circuit 22 is itself connected to one of the outputs of the registers 17 and 18 by means of a multiplexer 23 with two parallel inputs and one parallel output, multiplexers 24, 25, 25', 26, 36 and 38, a demultiplexer 39, series subtraction circuits 27, 28 and 29, series adder circuits 30 and 31, delay circuits 32, 33 and 34 to delay the propagation of binary data elements by k cycles, and a storage circuit 35 to store the comparison result.

For further details, reference should be made to the European patent application referred to earlier (EP-0 601 907 A2) and especially to the passages, page 15, lines 29 to 53 and page 17, line 51, to page 18, line 54, for further details pertaining to the description of the circuit.

In a circuit of this kind, when it is desired to carry out an operation $P_{field}(A, B)_N$, the procedure used will be, for example, that indicated in European patent EP-0 601 907 A3 at page 19 lines 1 to 49. In short, the following steps will be carried out:

E1: the loading of the initial data elements which are $A_0$, representing the Bt least significant bits of A, into the register 16, B into the register 10, N into the register 12, $J_0$ which has been computed by a processor 2 external to the coprocessor 4 into the register 17, E2: the computation of the first iteration where X, Y and Z are data elements in transit in the coprocessor 4 and where S is loaded into the register 11:
  B1: the computation of $X=B*A_0$,
  B2: the computation of $Y=(X*J_0)$ mod $2^{Bt}$, where the operation mod $2^{Bt}$ corresponds only to a truncation,
  B3: the computation of $Z=X+(Y*N)$,
  B4: the computation of $S=Z\backslash 2^{Bt}$, where the symbol \ represents an integer division,
  B5: if S is greater than N then N is subtracted from S, E3: the computation of the following iterations where i varies from 1 to m−1:
  B1: the loading of $A_i$ in place of $A_0$,
  B2: the computation of $X=S+(B*A_i)$,
  B3: the computation of $Y=(X*J_0)$ mod $2^{Bt}$, where the operation mod $2^{Bt}$ corresponds only to a truncation,
  B4: the computation of $Z=X+(Y*N)$,
  B5: the computation of $S(i)=Z\backslash 2Bt$ where the symbol \ represents an integer division,
  B6: if S(i) is greater than N then N is subtracted from S(i), E4: at the last iteration, S is loaded into the register 10.

For further details, reference may be made to the European patent referred to earlier (EP-0 601 907 A3) and more particularly to the following passages: page 2 line 42 to page 6 line 17 and page 19 lines 1 to 49.

As can be seen, $J_0$ is computed externally to the coprocessor. To replace a relatively slow software computation, the invention is directed to a circuit 5 dedicated inter alia to the computation of $J_0$.

Figure 3:
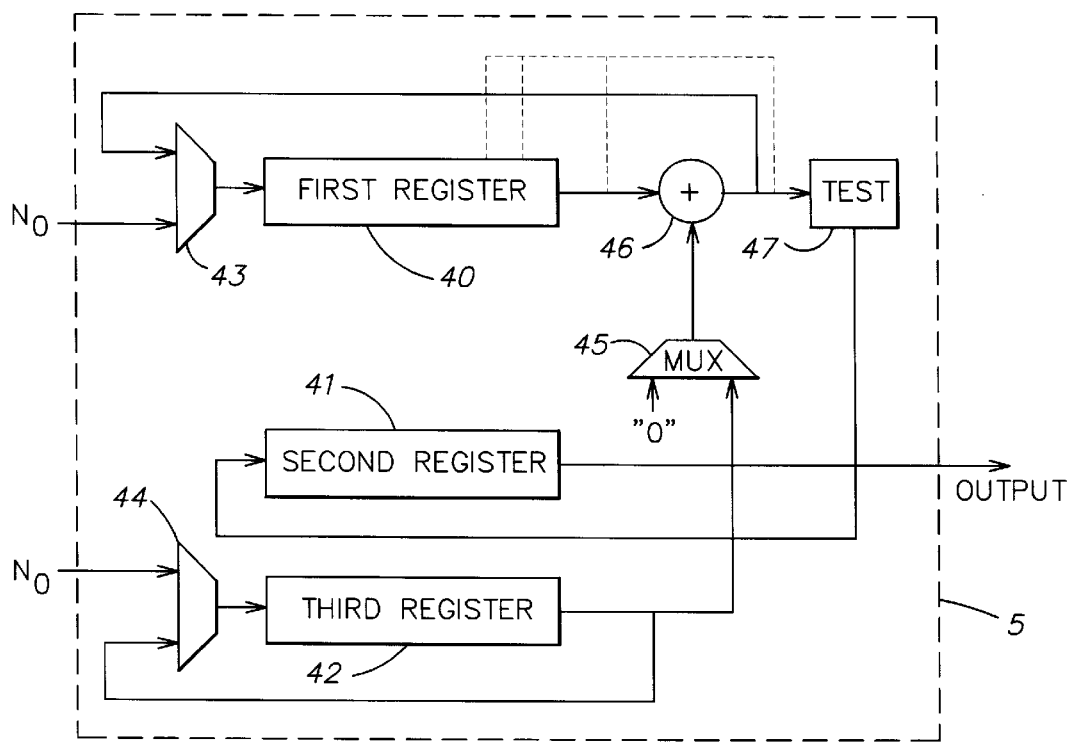
FIG. 3 shows a circuit implemented in the production of the computation parameter $J_0$ according to an embodiment of the present invention.

A preferred embodiment of this circuit 5 can be seen in FIG. 3 and it comprises inter alia: a first shift register, a second shift register and a third shift register 40, 41 and 42 with Bt bits, each having a series input and a series output, three multiplexers 43, 44 and 45 each having a first input and a second input and an output, an adder 46 having a first series input, a second series input, and a series output, and a testing circuit 47 having an input and an output.

These different elements are connected to one another as follows. The first register 40 has its input connected to the output of the multiplexer 43 and its output connected to the first input of the adder 46. The second register 41 has its input connected to the output of the testing circuit 47 and its output connected to an output terminal of the circuit 5. The third register has its input connected to the output of the multiplexer 44 and its output connected to the first input of the multiplexer 44 and to the first input of the multiplexer 45. The multiplexer 43 has its first input connected to the output of the adder 46 and to the input of the testing circuit 47, and its second input is connected to a first input terminal of the circuit 5. The multiplexer 44 has its second input connected to a second input terminal of the circuit 5, and the multiplexer 45 has its second input connected to a logic zero (in general 0 volts).

The control signals for the multiplexers and the registers are not shown in order to give clarity to the drawing of FIG. 3. The different control signals are generated by a state machine that can easily be made by those skilled in the art after having read the description of the method for producing the parameter $J_0$ using this circuit.

With a circuit of this kind, or one of its variants, several sequences of operations are possible but very few can be used to obtain the computation of $J_0$. A first method for the use of this circuit enabling the computation of $J_0$ uses the following steps:

E1: an information element $N_0$ encoded on Bt bits is loaded, the least significant bit of $N_0$ being equal to 1, into a first and third register 40 and 42 with Bt bits, by means of first and second input terminals and by means of the multiplexers 43 and 44, E2: the contents of the second register 41 are shifted rightwards by one unit, a 1 is loaded into the most significant bit of this second register 41, the contents of the first register 40 are added bit by bit with a zero in the series adder 46, the output of the adder 46 being connected to the input of the first register 40, the second least significant bit is tested at the output of the adder 46 by means of the testing circuit 47, E3: a loop, indexed by i, with i varying from 1 to Bt−1, is implemented, in other words the state machine that will sequence the circuit will repeat (Bt−1) times the steps of a loop iteration, each iteration comprising the following steps:
  B1: the contents of the first register 40 are shifted rightwards by one unit; this corresponds to a division by two of the contents of this register in overlooking the rest,
  B2: depending on the result of the last test performed, one of the following two operations is carried out:
    T1: if the bit checked (the "control bit") is equal to 1, then the contents of the second register 41 are shifted rightwards by one unit and a zero is loaded, via the testing circuit 47, into the most significant bit of the second register 41, the contents of the first register 40 are added bit by bit with a logic zero into the adder 46, the output of the adder 46 being connected to the input of the first register 40, and the second least significant bit is tested at the output of the adder 46 by means of the testing circuit 47, T2: if the control bit is equal to 0, then the contents of the second register 41 are shifted rightwards by one unit and a 1 is loaded, via the testing circuit 47, into the most significant bit of the second register 41, the contents of the first and third registers 40 and 42 are added bit by bit into the adder 46, an output of the adder 46 being connected to the input of the first register 40, the output of the third register 42 being looped back to its own input, and the second least significant bit is tested at the output of the adder 46 by means of the testing circuit 47, E4: the second register contains the desired parameter $J_0$, it is now possible to recover the result at the output terminal.

The use of this first method of computing $J_0$ is not optimized because certain steps have unnecessary operations aimed at the maximum simplification of the sequencing of the circuit. However, the time taken to carry out such a method will be noted. This time is measured in terms of numbers of clock cycles taken up by the sequencing of the method:

the steps E1 and E2 each use Bt clock cycles, the step E3 uses (Bt−1) times the steps B1 and B2, the step B1 uses one clock cycle, the step B2 uses either the step T1 or the step T2, each of which uses Bt clock cycles, the step E4 uses Bt clock cycles, in all, the method uses $2*Bt+(Bt-1)*(Bt+1)+Bt=Bt^2+(3*Bt)-1$ clock cycles including the step E4.

If it is decided to integrate a device of this kind into a coprocessor, for example of the type described either in the European patent (EP-0 601 907 A3), the second register 41 can coincide with the register 17 (FIG. 2). This enables the elimination of Bt clock cycles and obtaining the parameter $J_0$ in $Bt^2+(2*Bt)-1$ clock cycles.

A second use of the circuit enabling the computation of $J_0$ uses the following steps:

E1: the loading of the number 1 represented on Bt bits into a first register 40, E2: the loading of an information element $N_0$ encoded on Bt bits, the least significant bit of $N_0$ being equal to 1, into a third register 42 of Bt bits, E3: the implementation of a loop indexed by i, with varying from 1 to Bt, each iteration comprising the following steps:

B1: subsequent to the result of the last test performed, one of the following two operations is done, for the first iteration T2 is carried out:

T1: if the least significant bit is equal to 0, then the contents of the second register 41 are shifted rightwards by one unit and a 0 is loaded into the most significant bit, the contents of the first register 40 are added bit by bit with a zero into the adder 46, the output of the adder 46 being connected to the input of the first register 40, the second least significant bit at the output of the adder 46 is tested by means of the testing circuit 47, T2: if the least significant bit is equal to 1, then the contents of the second register 41 are shifted rightwards by one unit and a 1 is loaded into the most significant bit, the contents of the first and third registers 40 and 42 are added bit by bit into the adder 46, an output of the adder 46 being connected to an input of the first register 40, an output of the third register 42 being looped back to its own input, and the second least significant bit is tested at the output of the adder 46 by means of the testing circuit 47, B2: the contents of the first register 40 are shifted rightwards by one unit, E4: the second register 41 contains the desired parameter $J_0$; it can be recovered at the output terminal.

The use of this second method to compute $J_0$ is also not optimized. Indeed, certain steps comprise unnecessary operations that are aimed at the maximum simplification of the sequencing of the circuit. However, the time taken to carry out a method of this kind will be noted. This time is measured in number of clock cycles used by the sequencing of the method:

the steps E1 and E2 each use Bt clock cycles, the step E3 uses (Bt−1) times the steps B1 and B2, the step B1 uses either the step T1 or the step T2, each of which uses Bt clock cycles, the step B2 uses one clock cycle, the step E4 uses Bt clock cycles, in all, the method uses $2*Bt+Bt*(Bt-1)*(Bt+1)+Bt=Bt2+(4*Bt)-1$ clock cycles including the step E4.

For this second method, it may also be decided to integrate the device into a coprocessor, for example of the type described earlier in the European patent (EP-0 601 907 A3). The second register 41 may coincide with the register 17 (FIG. 2). This enables the elimination of Bt clock cycles and the obtaining of the parameter $J_0$ at $Bt^2+(3*Bt)$ clock cycles. This second method is slightly slower than the first method referred to. It is observed however that, for this method, the steps E1 and E2 may be merged, thus enabling the further economizing of Bt clock cycles.

Other improvements may be made by modifying the circuit 5. The testing circuit 47 may have its input connected either to the output of the first register 40 or directly to one of the bits of the first register 40, as can be seen in dashes in FIG. 3. A modification of this type means that it is no longer necessary to make operations of addition of the first register 40 with a logic zero, which is necessary if the testing circuit 47 is placed at output of the adder 46. The operation could then be limited to the performance, for the first method, of the following steps, the order of which may be changed:

E1: the loading of an information element $N_0$ encoded on Bt bits, the least significant bit of $N_0$ being equal to 1, in a first and third register 40 and 42 of Bt bits, E2: the loading of a 1 in the most significant bit of a second register 41 of Bt bits, E3: the implementation of a loop, indexed by i, i varying from 1 to Bt−1, each iteration comprising the following steps:

B1: the contents of the first register 40 are shifted rightwards by one unit, B2: the least significant bit of the first register 40 is tested:

T1: if the least significant bit is equal to 1, then the contents of the second register 41 are shifted rightwards by one unit and a 0 is loaded into the most significant bit, T2: if the least significant bit is equal to 0, then the contents of the second register 41 are shifted rightwards by one unit and a 1 is loaded into the most significant bit, the contents of the first and third registers 40 and 42 are added bit by bit into the adder 46, the output of the adder 46 being connected to the input of the first register 40, an output of the third register 42 being looped to its input.

E4: the second register 41 contains the desired parameter J0. It can be recovered at the output terminal.

Naturally, those skilled in the art will understand that the test can also be performed on the second least significant bit of the first register 40 provided that the shift is done rightwards by one unit after the test has been performed. A method of this kind will enable the parameter $J_0$ to be computed in a variable number of clock cycles that can be subdivided as follows:

the step E1 uses Bt clock cycles, the step E2 which can be performed at the same time as E1 uses no clock cycle, the step E3 does Bt−1 times the steps B1 and B2, B1 using one clock cycle and B2 using 1 or Bt clock cycles, the step E4 uses Bt clock cycles.

In all, including step E4, $4*Bt-2$ and $Bt^2+(2*Bt)-1$ clock cycles are used. Naturally, depending on the embodiment, it is possible to subtract or not subtract the Bt clock cycles used in the step E4.

It is also possible to modify the second method by limiting the operation to the following steps:

E1: the loading of the number 1 represented on Bt bits into a first register 40 of Bt bits, E2: the loading of an information element $N_0$ encoded on Bt bits, the least significant bit of $N_0$ being equal to 1, into a third register 42 of Bt bits, E3: the implementation of a loop, indexed by i, with i varying from 1 to Bt, each iteration comprising the following steps:

B1: the least significant bit of the first register 40 is tested:

T1: if the least significant bit is equal to 0, then the contents of the second register 41 are shifted rightwards by one unit and a 0 is loaded into the most significant bit, T2: if the least significant bit is equal to 1, then the contents of the second register 41 are shifted rightwards and a 1 is loaded into the most significant bit, the contents of the first and third registers 40 and 42 are added bit by bit into the adder 46, an output of the adder 46 being connected to an input of the first register 40, an output of the third register 42 being looped to its input, B2: the contents of the first register 40 are shifted rightwards by one unit, E4: the second register 41 contains the desired parameter $J_0$, it can be recovered at the output terminal.

Here too, those skilled in the art will understand that the test can also be performed on the second least significant bit of the first register 40 provided that the shift is done rightwards by one unit after the test has been performed. This method enables the computation of the parameter $J_0$ in a variable number of clock cycles that can be subdivided as follows:

the steps E1 and E2 use Bt clock cycles that are counted only once, the step E3 does Bt times the steps B1 and B2, B1 using one clock cycle and B2 using one or Bt clock cycles, the step E4 uses Bt clock cycles.

In all, including step E4, between $4*Bt$ and $Bt^2+(3*Bt)$ clock cycles are used. Naturally, depending on the embodiment, it is possible to subtract or not subtract the Bt clock cycles used in the step E4.

As can be seen, this second method, even when modified, uses Bt+1 clock cycles more than the first method. It is possible to eliminate these additional cycles by modifying the steps E1 and E3 as follows:

E1: the loading of $(N_0+1) \mod 2^{Bt}$ into a first register 40 and the loading of a 1 into a most significant bit in a second register, E3: the implementation of a loop indexed by an index i, with i varying from 1 to Bt−1, each iteration comprising the steps B1 and B2 defined here above.

The fact of using $N_0$ may appear to be a computation step that cannot be accounted for. It is quite possible to carry out this computation by software means in the processor 2 while loading the data elements $N_0$ and $N_0+1$. If the processor is a low performance device and cannot carry out these simultaneous processing operations, it is then possible for those skilled in the art to add on a supplementary series adder between an input terminal and the multiplexer 43, the addition being done simultaneously with the loading without the addition of supplementary periods of time.

Figure 4:
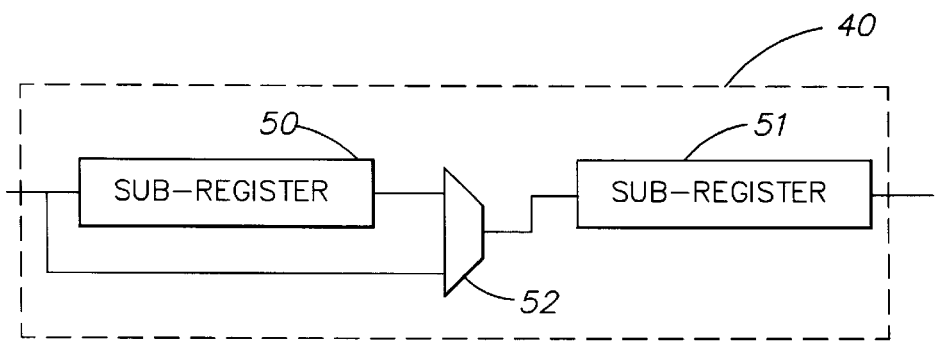
FIGS. 4 and 5 show variably sized registers that can be used with an embodiment of the present invention.
Figure 5:
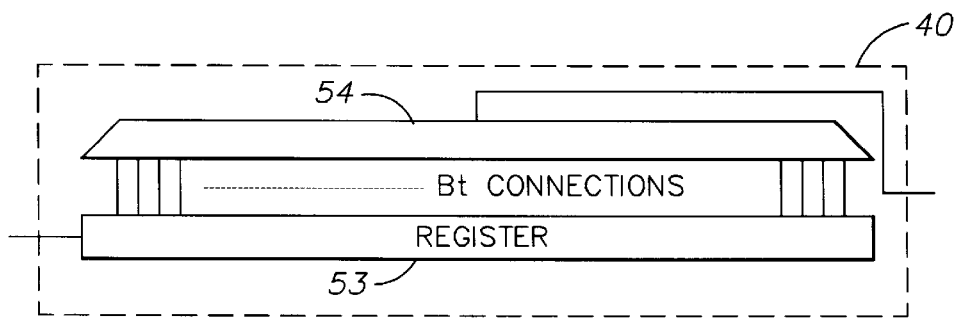

Conventionally, the calculation bases used are 32-bit bases. This amounts in the invention to using Bt=32 bit registers. It is highly possible that in the near future there will be circuits using bigger sized computation bases, for example with 64 bits. The invention therefore proposes the use of registers of variable size as described in FIG. 4. FIG. 4 shows a register 40 that can be the register 41 or 42 which is subdivided into two shift registers 50 and 51 of Bt bits, each having an input and a series output, a multiplexer 52 having a first input connected to the output of the register 50, a second input connected to the input of the register 50 and an output connected to the input of the register 51. A device of this kind behaves like a shift register 40 having its input merged with the input of the register 50 and its output merged with the output of the register 51. However, depending on the command of the multiplexer, the shift register 40 will have a size varying by Bt or by 2*Bt bits. Those skilled in the art will have no difficulty in conceiving of a register divided into three, four, or more sub-registers.

Another possibility using a variable size of register is possible. This possibility is applicable to the registers 40 and 42. It has been seen in the methods for the production of $J_0$ that up to Bt operations of addition are performed on Bt bits. Now, each addition performed actually requires a computation on one bit less than the previous one. A computation has therefore been devised using variable sized registers during the running of the method. The third register 42 is constituted as described here above except for the fact that it is formed by Bt one-bit sub-registers and therefore Bt−1 multiplexers. The first register 40 is formed by a register 53 of Bt bits having a series input and a parallel output and a demultiplexer 54 having Bt inputs connected to the parallel output of the register 53. The register 40 in fact has, as a series input, the series input of the register 53 and, as a series output, the output of the demultiplexer 54. The use of such registers enables the rightward shift by one unit of the contents of the first register 40 to be replaced by a decrementation of the size of the registers 40 and 42. This has the effect of eliminating a clock cycle at each iteration of the loop with respect to the previous one. The following numbers of cycles are then obtained:

for the first detailed method $(Bt^2/2)+(2*Bt)-2$ in counting the step E4, for the second detailed method $(Bt^2/2)+(3.5*Bt)$ in counting the step E4, for the third detailed method $(Bt^2/2)+Bt-1$ in counting the step E4, for the fourth detailed method $(Bt^2/2)+(3.5*Bt)$ in counting the step E4.

It will be noted that, for the third and fourth methods, the number of clock cycles is the maximum number of clock cycles used, for the minimum number of cycles does not vary.

Whatever the circuit used, it is preferable to integrate it into a coprocessor, for example the coprocessor 4. A first embodiment of this type has already been described here above. It includes substituting the second register 41 of the invention for the register 17 of the coprocessor 4.

A second embodiment uses a maximum number of elements of the coprocessor 4. It is possible for example to use the register 10 as a first register 40 and the register 12 as the third register 42 on condition that there are variable sized registers 10 and 12. It will be easy for those skilled in the art to understand the way in which the multiplexers 13, 15, 36 and 18 are substituted for the multiplexers 43, 44 and 45. The subtraction circuit 27 would be replaced by a circuit capable of performing both addition and subtraction to have the functions of the adder 46. Finally, the register 17 would be substituted for the second register 41. In order to enable the $J_0$ computation function to be achieved, all that is needed is a test circuit 47 that will have its output connected to the input of the register 17 and its input connected to one of the bits of the register 10. There is also a connection missing between the output of the addition/subtraction circuit which replaces the subtraction circuit 27 and a fourth input of the multiplexer 13. Those skilled in the art will be able to adopt the same kind of approach with an arithmetic processor or coprocessor and the circuit described in the invention without departing from the spirit of the invention. Similarly, other variants of the circuit are possible both in the sequencing and in the making of the circuit.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for producing, in an integrated circuit, a parameter $J_0$ associated with implementing modular operations according to a Montgomery method, $J_0$ being encoded on Bt bits, the method comprising the steps of:

(E1) loading an information element $N_0$ encoded on Bt bits in first and third registers of Bt bits, a least significant bit of $N_0$ being equal to 1;

(E2) loading a 1 into a most significant bit of a second register of Bt bits;

(E3) for each value of an index i that varies from 1 to Bt-1, shifting a contents of the first register rightwards by one unit; testing a less significant bit of the first register; and performing one of (T1) shifting a contents of the second register rightwards by one unit and loading a 0 into a most significant bit of the second register when the step of testing indicates the less significant bit of the first register is equal to 1, and (T2) shifting the contents of the second register rightwards by one unit and subsequently loading a 1 into the most significant bit of the second register, and adding the contents of the first and third registers bit by bit in an adder when the step of testing indicates the less significant bit is equal to 0, an output of the adder being connected to an input of the first register and an output of the third register being looped back to an input of the third register; and (E4) recovering the parameter $J_0$ from the contents of the second register.

2. The method of claim 1, wherein the less significant bit of the first register is a second least significant bit of the first register.

3. The method of claim 1, wherein step T1 further includes, after the step of loading the 0, a step of adding the contents of the first register bit by bit with a zero in the adder.

4. The method of the claim 1, wherein the first, second, and third registers are variably sized registers controlled by multiplexers, the method further comprising a step of adjusting a size of the first, second, and third registers.

5. The method of claim 3, wherein step E2 further includes steps of:

shifting, prior to the step of loading the 1, the contents of the second register rightwards by one unit; and adding, after the step of loading the 1, the contents of the first register bit by bit with a zero in the adder.

6. The method of claim 4, further comprising a step of diminishing the size of the first and third registers during production of the parameter $J_0$.

7. The method of claim 5, wherein the step of testing the less significant bit tests a bit occupying a $2^1$ position in the step of adding the contents of the first register bit by bit in step E2.

8. The method of claim 5, wherein the step of testing the less significant bit tests the bit occupying the $2^1$ position in the step of adding the contents of the first and third registers bit by bit.

9. A method for producing, in an integrated circuit, a parameter $J_0$ associated with implementing modular operations according to a Montgomery method, $J_0$ being encoded on Bt bits, the method comprising the steps of:

(E1) loading a 1 represented on Bt bits into a first register of Bt bits;

(E2) loading an information element $N_0$ encoded on Bt bits in a third register of Bt bits, a least significant bit of $N_0$ being equal to 1;

(E3) for each value of an index i that varies from 1 to Bt, (A) testing a least significant bit of the first register;

(B) performing one of (T1) shifting a contents of a second register rightwards by one unit and loading a 0 into a most significant bit of the second register when the step of testing indicates the least significant bit of the first register is equal to 0, and (T2) shifting the contents of the second register rightwards by one unit, loading a 1 into the most significant bit of the second register, and adding a contents of the first and third registers bit by bit in an adder when the step of testing indicates the least significant bit is equal to 1, an output of the adder being connected to an input of the first register and an output of the third register being looped back to an input of the third register; and (C) shifting a contents of the first register rightwards by one unit; and (E4) recovering the parameter $J_0$ from the contents of the second register.

10. The method of claim 9, wherein step T1 further includes, after the step of loading the 0, a step of adding the contents of the first register bit by bit with a zero in the adder.

11. The method of claim 9, wherein the step of testing tests a bit occupying a $2^1$ position in the step of adding the contents of the first and third registers bit by bit, and wherein the step of testing validates step T2 in a first iteration.

12. The method of the claim 9, wherein the first, second, and third registers are variably sized registers controlled by multiplexers, the method further comprising a step of adjusting a size of the first, second, and third registers.

13. The method of claim 9, wherein step T2 is performed when the value of the index i is 1.

14. The method of claim 12, further comprising a step of diminishing the size of the first and third registers during production of the parameter $J_0$.

15. A method for producing, in an integrated circuit, a parameter $J_0$ associated with implementing modular operations according to a Montgomery method, $J_0$ being encoded on Bt bits, the method comprising the steps of:

(E1) loading $(N_0+1)$ mod $2^{Bt}$ represented on Bt bits into a first register of Bt bits and loading a 1 into a most significant bit of a second register, $N_0$ being an information element encoded on Bt bits;

(E2) loading $N_0$ in a third register of Bt bits, a least significant bit of $N_0$ being equal to 1;

(E3) for each value of an index i that varies from 1 to Bt−1, (A) testing a least significant bit of the first register;

(B) performing one of (T1) shifting a contents of a second register rightwards by one unit and loading a 0 into a most significant bit of the second register when the step of testing indicates the least significant bit of the first register is equal to 0, and (T2) shifting the contents of the second register rightwards by one unit and subsequently loading a 1 into the most significant bit of the second register, and adding a contents of the first and third registers bit by bit in an adder when the step of testing indicates the least significant bit is equal to 1, an output of the adder being connected to an input of the first register and an output of the third register being looped back to an input of the third register; and (C) shifting a contents of the first register rightwards by one unit; and (E4) recovering the parameter $J_0$ from the contents of the second register.

16. An electronic circuit for computing a parameter $J_0$ encoded on Bt bits, $J_0$ being defined such that $((J_0*N_0)+1)$ mod $2^{Bt}=0$, $N_0$ being encoded on Bt bits, the circuit comprising:

a first register, a second register, and a third register, each register having n bits and having one serial input and one serial output, the third register having its serial input connected to its serial output;

an adder circuit having a first series input connected to the serial output of the first register, a second series input, and a series output connected to the serial input of the first register;

a multiplexer circuit having an output connected to the second series input of the adder circuit, a first input connected to the serial output of the third register and a second input connected to a potential corresponding to a logic zero; and a testing circuit having an input connected to the series output of the adder circuit and an output connected to the serial input of the second register.

17. The electronic circuit of claim 16, wherein an output terminal of the electronic circuit is connected to the serial output of the second register.

18. The electronic circuit of claim 16, wherein the first, second, and third registers are each coupled to a respective multiplexer, each respective multiplexer adjusting a size of the first, second, and third registers, respectively.

19. The electronic circuit of claim 16, wherein the electronic circuit is integrated into a coprocessor.

20. The electronic circuit of claim 16, wherein the first, second, and third registers include a multiple of Bt bits.

21. The electronic circuit of claim 16, wherein the third register includes Bt one-bit registers controlled by Bt−1 multiplexers.

22. The electronic circuit of claim 16, wherein the first register includes:

a Bt bit sub-register having a series input and Bt parallel outputs, the series input of the Bt bit sub-register forming the serial input of the first register; and a Bt bit demultiplexer having Bt inputs and an output, each of the Bt inputs being coupled to a respective one of the Bt parallel outputs of the Bt bit sub-register, the output of the demultiplexer forming the serial output of the first register.

23. The electronic circuit of claim 19, wherein different elements of the electronic circuit are connected to other elements of the coprocessor to perform other modular operations.

24. The electronic circuit of claim 19, wherein the second register is shared with a register of the coprocessor that receives the parameter $J_0$.

25. The electronic circuit of claim 19, wherein the first, second and third registers are shared with respective registers in the coprocessor.

* * * * *